(12) United States Patent
Qiu (10) Patent No.: US 10,503,008 B2
(45) Date of Patent: Dec. 10, 2019

(54) QUANTUM DOT (QD) LAMPS AND DISPLAYS

(71) Applicant: HUIZHOU CHINA STAR OPTOELECTRONICS TECHNOLOGY CO., LTD., Huizshou Guangdong (CN)

(72) Inventor: Yongyuan Qiu, Huizhou Guangdong (CN)

(73) Assignee: HUIZHOU CHINA STAR OPTOELECTRONICS TECHNOLOGY CO, LTD., Huizhou, Guangdong (CN)

(*) Notice: Subject to any disclaimer, the term of this patent is extended or adjusted under 35 U.S.C. 154(b) by 0 days.

(21) Appl. No.: 16/023,542

(22) Filed: Jun. 29, 2018

(65) Prior Publication Data

US 2019/0265546 A1    Aug. 29, 2019

Related U.S. Application Data

(63) Continuation of application No. PCT/CN2018/080857, filed on Mar. 28, 2018.

(30) Foreign Application Priority Data

Feb. 28, 2018    (CN) .......................... 2018 1 0166120

(51) Int. Cl.
*G02F 1/1335* (2006.01)
*F21K 9/278* (2016.01)
(Continued)

(52) U.S. Cl.
CPC ........ *G02F 1/133604* (2013.01); *F21K 9/272* (2016.08); *F21K 9/275* (2016.08);
(Continued)

(58) Field of Classification Search
CPC ......... G02F 1/133603; G02F 1/133604; G02F 2001/133342; G02F 2001/133612;
(Continued)

(56) References Cited

U.S. PATENT DOCUMENTS 6,860,628 B2 * 3/2005 Robertson ................. F21K 9/68
313/512
2004/0246402 A1 * 12/2004 Yu ..................... G02F 1/133615
349/61

(Continued)

FOREIGN PATENT DOCUMENTS

CN    1060682 A    4/1992
CN    201266596 Y    7/2009
(Continued)

*Primary Examiner* — Alexander K Garlen
(74) *Attorney, Agent, or Firm* — Leong C. Lei (57) ABSTRACT

The present disclosure relates to a quantum dot (QD) lamp and a display. The QD lamp includes an elongated glass tube having two closed ends. The elongated glass tube includes an LED light bar, two ends of the LED light bar respectively are configured with one electrode, and the electrode respectively are protruding from the two ends of the glass tube. An inner wall or an outer wall of the glass tube are coated with QD phosphors. The LED light bar includes a circuit substrate, a plurality of LED chips disposed on the circuit substrate, and a silica gel layer configured to encapsulate the LED chips on the circuit substrate.

8 Claims, 7 Drawing Sheets

(51) Int. Cl.
  *F21K 9/275* (2016.01)
  *F21K 9/272* (2016.01)
  *G02F 1/1333* (2006.01)

(52) U.S. Cl.
  CPC ........ *F21K 9/278* (2016.08); *G02F 1/133603* (2013.01); *G02F 1/133605* (2013.01); *G02F 1/133608* (2013.01); *G02F 2001/133342* (2013.01); *G02F 2001/133612* (2013.01); *G02F 2001/133614* (2013.01); *G02F 2202/36* (2013.01)

(58) Field of Classification Search
  CPC .. G02F 2001/133614; F21K 9/64; F21K 9/66; F21Y 2103/10
  See application file for complete search history.

(56) References Cited

U.S. PATENT DOCUMENTS

| | | | | |
|---|---|---|---|---|
| 2009/0213573 | A1* | 8/2009 | Furukawa | F21K 9/00 362/97.1 |
| 2010/0171904 | A1* | 7/2010 | Hung | G02F 1/133603 349/67 |
| 2011/0058372 | A1* | 3/2011 | Lerman | H05K 1/0204 362/235 |
| 2011/0141746 | A1* | 6/2011 | Ing | G02F 1/133608 362/311.04 |
| 2013/0235555 | A1* | 9/2013 | Tanaka | F21V 3/12 362/84 |
| 2013/0293098 | A1* | 11/2013 | Li | F21V 3/02 313/512 |
| 2015/0022114 | A1* | 1/2015 | Kim | H05B 33/0803 315/294 |
| 2016/0365491 | A1* | 12/2016 | Chen | G02B 6/0073 |
| 2017/0211779 | A1* | 7/2017 | Pickett | F21K 9/275 |
| 2017/0292683 | A1* | 10/2017 | Kim | F21V 23/06 |

FOREIGN PATENT DOCUMENTS

| | | |
|---|---|---|
| CN | 201527991 U | 7/2010 |
| CN | 201680287 U | 12/2010 |
| CN | 201680288 U | 12/2010 |
| CN | 105068320 A | 11/2015 |

\* cited by examiner

QUANTUM DOT (QD) LAMPS AND DISPLAYS

CROSS REFERENCE TO RELATED APPLICATIONS

This application is a continuing application of PCT Patent Application No. PCT/CN2018/080857, entitled "QUANTUM DOT LAMPS AND DISPLAYS", filed on Mar. 28, 2018, which claims priority to Chinese Patent Application No. 201810166120.7, filed on Feb. 28, 2018, both of which are hereby incorporated in its entireties by reference.

BACKGROUND

1. Technical Field

The present disclosure generally relates to liquid crystal display manufacturing technology field, and especially relates to a quantum dot (QD) lamp and a display.

2. Description of Related Art

Due that quantum dot (QD) emits narrow-peak emission and the wavelength of the emission can be adjusted according to the dimension, it is widely applied to backlight products nowadays. The QD material mainly uses CdSe as the core, and uses CdS as the shell in the commercial market. Therefore, the QD material needs to be protected for the application of the QD in the commercial market. The method mainly have two: one is a form of the QD film to encapsulate the QD material through the PET including a water passivation layer) and the other is a form of the QD stripe that utilizes a holly glass tube to encapsulate the QD material.

However, in the conventional technology, the QD film needs to use a lot of the QD materials, and it is difficult to control the chroma in the backlight unit (BLU), resulting that the productivity is low. On the other hand, when the QD stripe structure is applied in the side edge type backlight structure, the alignment between the QD lamp and the LED light bar is difficult, making that the energy is mostly decaying, and it is difficult to realize the design of thin frame.

SUMMARY

The present disclosure relates to a quantum dot (QD) lamp and a display.

In one aspect, a quantum dot (QD) lamp is provided. The QD lamp includes an elongated glass tube having two closed ends, the elongated glass tube including an LED light bar, two ends of the LED light bar respectively configured with one electrode, and the electrode respectively protruding from the two ends of the glass tube; wherein an inner wall or an outer wall of the glass tube are coated with QD phosphors; and the LED light bar includes a circuit substrate, a plurality of LED chips disposed on the circuit substrate, and a silica gel layer configured to encapsulate the LED chips on the circuit substrate.

Wherein the inner wall of the glass tube is coated with the QD phosphors uniformly.

Wherein the outer wall of the glass tube is coated with the QD phosphors uniformly, and the QD phosphors are covered by a water-oxygen barrier layer.

Wherein the circuit substrate is a transparent flexible printed circuit or a Sapphire substrate.

Wherein a reinforcing layer is further disposed on the silica gel layer, and the reinforcing layer is a glass substrate or a Sapphire substrate.

Wherein radiating particles are dispersedly disposed in the silica gel layer, and inverted cones are formed in the silica gel layer corresponding to the top of each of the LED chips Wherein the water-oxygen barrier layer is made by SiOx material.

In another aspect, a display having direct-type backlight is provided. The display includes a direct-type backlight module, an optical film set disposed on the direct-type backlight module, and a display panel, wherein the direct-type backlight module comprises a reflective film disposed in an outer frame, a light guide disposed on the reflective film, and a plurality of quantum dot (QD) lamps being configured between the reflective film and the light guide, and the QD lamps are spaced apart from each other. Each of the QD lamps includes: an elongated glass tube having two closed ends, the elongated glass tube including an LED light bar, two ends of the LED light bar respectively configured with one electrode, and the electrode respectively protruding from the two ends of the glass tube. An inner wall or an outer wall of the glass tube are coated with QD phosphors. The LED light bar includes a circuit substrate, a plurality of LED chips disposed on the circuit substrate, and a silica gel layer configured to encapsulate the LED chips on the circuit substrate Wherein the circuit substrate is a transparent flexible printed circuit or a Sapphire substrate.

Wherein a reinforcing layer is further disposed on the silica gel layer, and the reinforcing layer is a glass substrate or a Sapphire substrate.

Wherein radiating particles are dispersedly disposed in the silica gel layer, and inverted cones are formed in the silica gel layer corresponding to the top of each of the LED chips.

Wherein a plurality of reflective curves facing to the light guide are formed on the reflective film, and the QD lamps are disposed in the reflective curves.

In another aspect, a two-sided display having direct-type backlight is provided. The two-sided display includes a first light guide and a second light guide disposed correspondingly with the first light guide, a first optical film set and a first display panel being sequentially disposed on one side of the first light guide, the one side of the first light guide being away from the second light guide, and a second optical film set and a second display panel being sequentially disposed on one side of the second light guide, the one side of the second light guide being away from the first light guide; wherein a closed space is formed in a frame sealing adhesive between the first light guide and the second light guide, and a plurality of quantum dot (QD) lamps are disposed in the closed space and are spaced apart with each other. Each of the QD lamps includes: an elongated glass tube having two closed ends, the elongated glass tube comprising an LED light bar, two ends of the LED light bar respectively configured with one electrode, and the electrode respectively protruding from the two ends of the glass tube. An inner wall or an outer wall of the glass tube are coated with QD phosphors. The LED light bar includes a circuit substrate, a plurality of LED chips disposed on the circuit substrate, and a silica gel layer being configured to encapsulate the LED chips on the circuit substrate.

Wherein the circuit substrate is a transparent flexible printed circuit or a Sapphire substrate.

Wherein a reinforcing layer is further disposed on the silica gel layer, and the reinforcing layer is a glass substrate or a Sapphire substrate.

Wherein radiating particles are dispersedly disposed in the silica gel layer, and inverted cones are formed in the silica gel layer corresponding to the top of each of the LED chips In view of the above, the present disclosure uses the glass tube where the encapsulated LED light bar are disposed and the wall of the glass tube is coated with the QD phosphors, so as to provide the QDs the environment of water-oxygen barrier, and use less the QD material compared to the QD film, therefore lowering the cost. Furthermore, a plurality of LED chips radiates uniformly in the wall of the glass tube to activate the QDs to emit light, so as to solve the problem of difficult alignment between the QD tube and the LED light bar.

DETAILED DESCRIPTION

Following embodiments of the invention will now be described in detail hereinafter with reference to the accompanying drawings.

In the drawings, the thicknesses of layers and regions may be exaggerated for clarity. Same reference numerals refer to the same components throughout the specification and the drawings.

The above description is merely the embodiments in the present disclosure, the claim is not limited to the description thereby. The equivalent structure or changing of the process of the content of the description and the figures, or to implement to other technical field directly or indirectly should be included in the claim.

Figure 1:
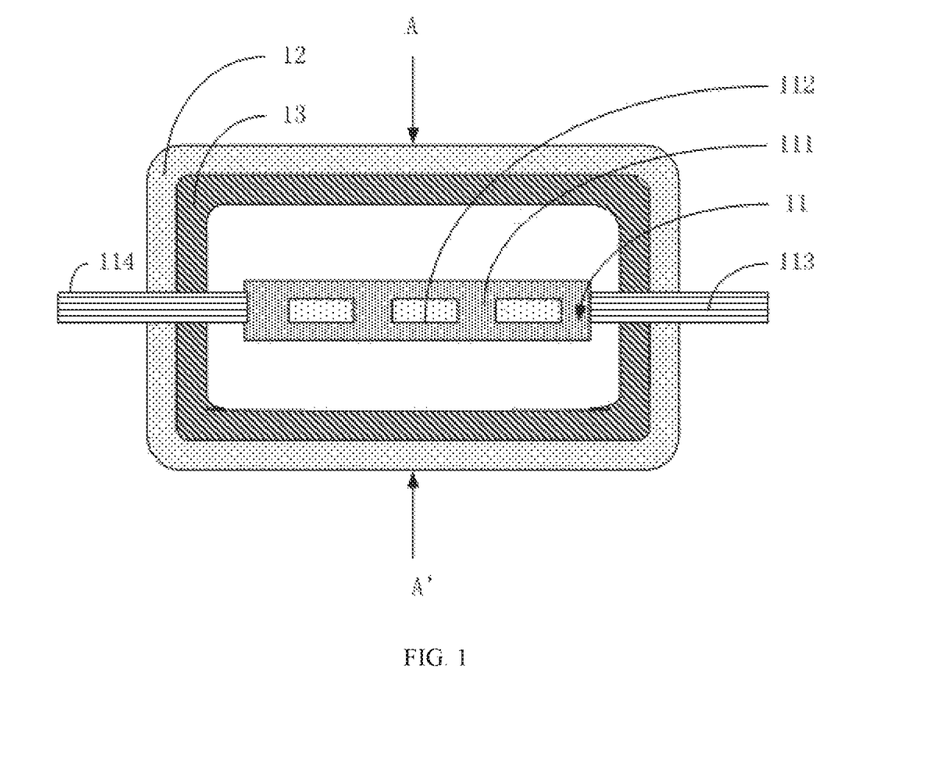
FIG. 1 is a schematic structure of a quantum dot (QD) lamp in accordance with one embodiment of the present disclosure

As shown in FIG. 1, FIG. 1 is a schematic structure of a quantum dot (QD) lamp in accordance with one embodiment of the present disclosure. Specifically, FIG. 1 is a cross-sectional view of the QD lamp in accordance with one embodiment of the present disclosure. In the embodiment, the QD lamp includes an LED light bar 11 and a glass tube 12. The LED light bar 11 is disposed within the glass tube 12. The glass tube 12 is an elongated glass tube having two closed ends.

The LED light bar 11 includes a circuit substrate 111, a plurality of LED chips 112 disposed on the circuit substrate 111, and a silica gel layer being configured to encapsulate the LED chips 112 on the circuit substrate 111. The circuit substrate is a transparent flexible printed circuit (FPC) or a Sapphire substrate. The material of the substrate is configured to be light transmissive.

Two ends of the LED light bar 11 respectively are configured with one electrode 113 and 114, and the electrodes 113 and 114 respectively are protruding from the two ends of the glass tube. The electrodes 113 and 114 are configured to be connected with a power source. The electrode may be a metal electrode or a graphite electrode, and the electrode configures the LED light bar to be fixed relatively in the glass tube.

An inner wall of the glass tube 12 is coated with QD phosphors 13 configured to be activated to emit light via LED light. In order to achieve better emitting efficiency, the QD phosphors are distributed uniformly. Due that the QD phosphors are located within the closed glass tube, the water oxygen is isolated, so as to solve the malfunction problem.

It needs to be explained that to achieve better heat dissipation, the LED chip of the present disclosure utilizes LED chip having low current and small watt, such that heat of the single chip is not high.

Figure 2:
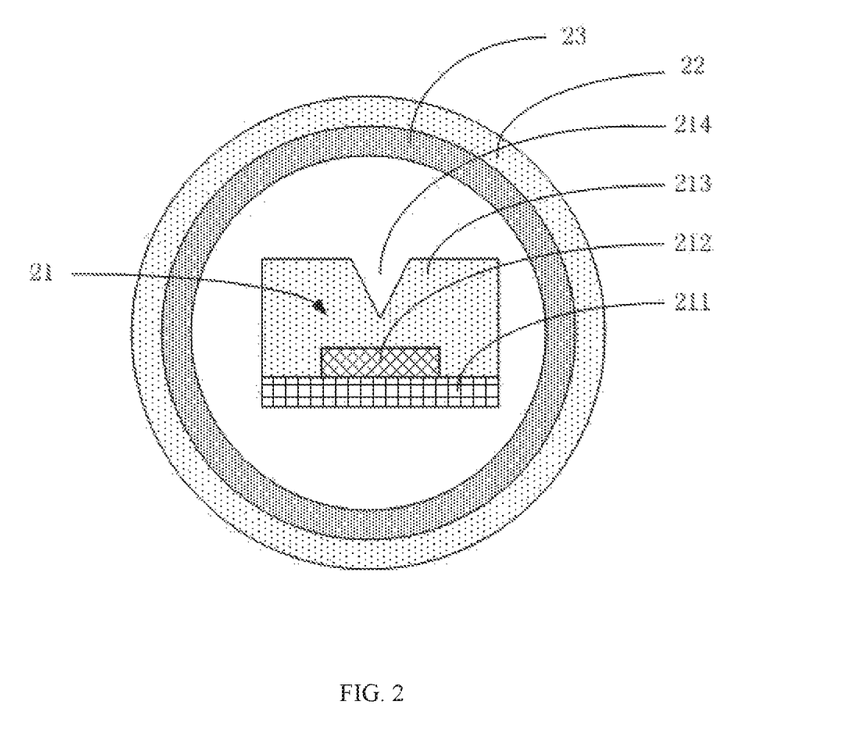
FIG. 2 is a cross-sectional view taken along the line AA' of the QD lamp of FIG. 1 in accordance with one embodiment of the present disclosure.

FIG. 2 is a cross-sectional view taken along the line AA' of the QD lamp of FIG. 1 in accordance with one embodiment of the present disclosure. As shown in FIG. 2, the QD lamp includes an LED light bar 21 and a glass tube 22. The LED light bar 21 is disposed within the glass tube 22. The LED light bar 21 includes a circuit substrate 211, a plurality of LED chips 212 disposed on the circuit substrate, and a silica gel layer 213. The silica gel layer 213 is configured to encapsulate the LED chips 212 on the circuit substrate 211.

In order to achieve better emitting efficiency, radiating particles are dispersedly disposed in the silica gel layer. In addition, inverted cones 214 are formed in the silica gel layer 213 corresponding to the top of each of the LED chips 212, such that the middle light forms broad angle light by the reflection of the inverted cones. At this moment, the LED light is not a Lambertian form. The light forms the distribution of 360 degrees via internal radiation, and then activates the QD phosphors in the inner wall of the glass tube to emit light.

Figure 3:
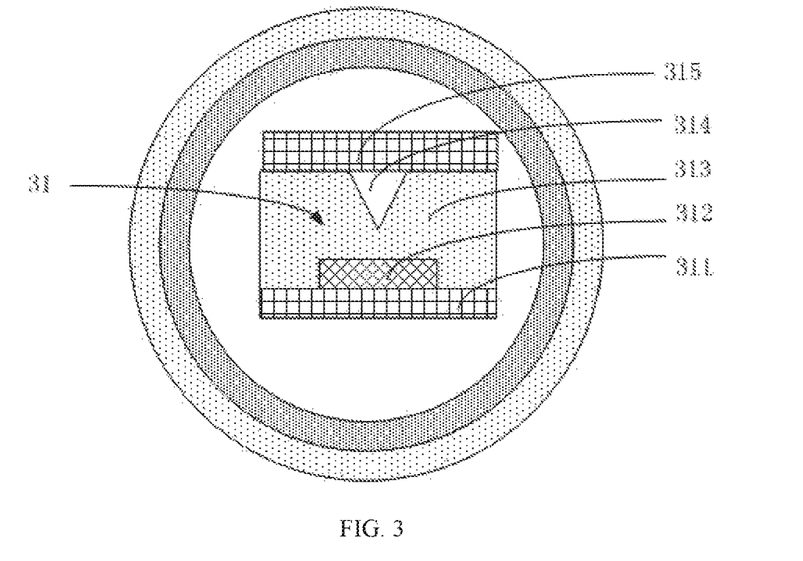
FIG. 3 is a cross-sectional view taken along the line AA' of the QD lamp of FIG. 1 in accordance with another embodiment of the present disclosure.

FIG. 3 is a cross-sectional view taken along the line AA' of the QD lamp of FIG. 1 in accordance with another embodiment of the present disclosure. As shown in FIG. 3, the QD lamp includes an LED light bar 31. LED chips 312 are disposed on a circuit substrate 311 of the LED light bar 31. A silica gel layer 313 is configured to encapsulate the LED chips 312 on the circuit substrate 311. Inverted cones 314 are formed in the silica gel layer 313 corresponding to the top of each of the LED chips. A layer of glass 315 is disposed on the silica gel layer 313. The glass 315 may be replaced by a Sapphire substrate.

In above two embodiments, the circuit substrate 311 is a transparent flexible printed circuit. Due that the flexible printed circuit material is not solid, a reinforcing layer 315 is further disposed in the silica gel layer 313. The reinforcing layer 315 may be a glass substrate or a Sapphire substrate, to reinforce the whole light bar 31.

Figure 4:
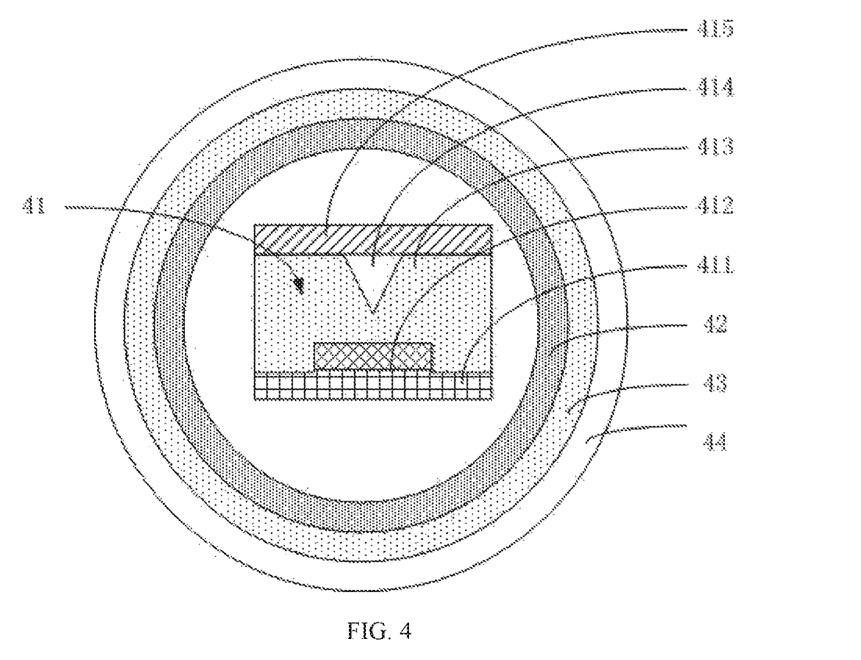
FIG. 4 is a cross-sectional view of the QD lamp in accordance with another embodiment of the present disclosure.

In another embodiment of the present disclosure, as shown in FIG. 4, a QD lamp is provided in the embodiment of the present disclosure. The QD lamp includes a glass tube 42 and an LED light bar 41 disposed in the glass tube 42. The LED light bar 41 includes a glass substrate 411, a plurality of LED chips 412 disposed on the glass tube 411, a silica gel layer 413 configured to encapsulate the LED chips 412 on the glass substrate 411, and a glass 415.

Inverted cones 414 are formed in the silica gel layer 413 corresponding to the top of each of the LED chips 412. The glass 415 may be replaced by a Sapphire substrate.

An outer wall of the glass tube 42 is coated with QD phosphors 43. In order to achieve better emitting efficiency, the QD phosphors 43 are coated uniformly. In order that the QD phosphors 43 are prevented from water oxygen, the QD phosphors 43 are covered by a water-oxygen barrier layer 44. The water-oxygen barrier layer 44 is made by SiOx material and is formed on the surface of the QD phosphors 43 via evaporation process to isolate the QD phosphors 43 from air to avoid the effect of water and oxygen on the QD.

It can be understood that in the structure of the outer wall of the glass tube being coated with the QD phosphors 43, the reinforcing layer 315 may be omitted in another embodiment similar to the FIG. 2.

Figure 5:
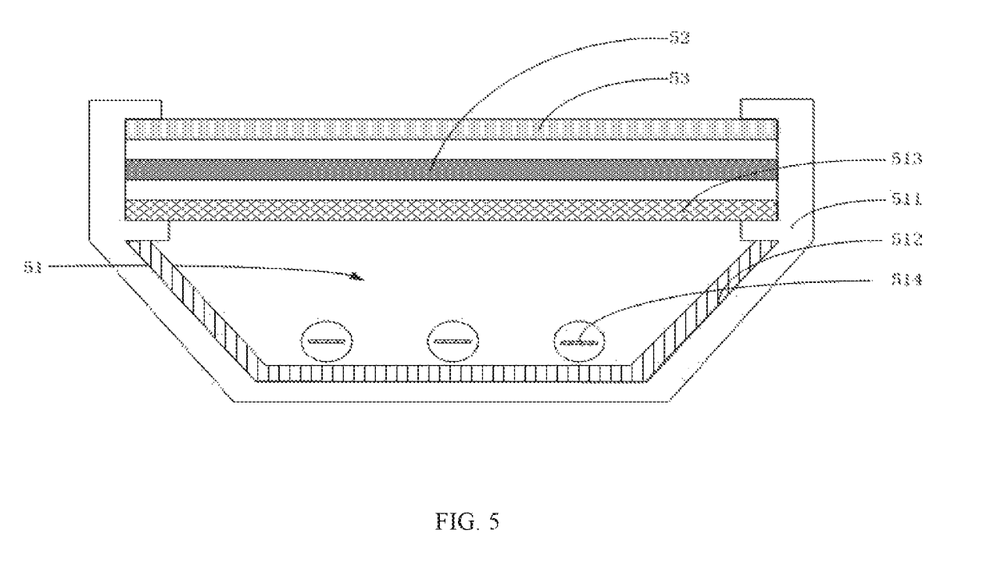
FIG. 5 is a schematic diagram of a display having direct-type backlight in accordance with one embodiment of the present disclosure.

A corresponding display is provided in the present disclosure. As shown in FIG. 5, FIG. 5 is a schematic diagram of a display having direct-type backlight in accordance with one embodiment of the present disclosure. In the embodiment, the display includes a direct-type backlight module 51, an optical film set 52 disposed on the direct-type backlight module, and a display panel 53. The direct-type backlight module 51 includes an outer frame 511, a reflective film 512 disposed in the outer frame 511, a light guide 513 disposed on the reflective film 512, and a plurality of QD lamps 514.

The QD lamps 514 are configured between the reflective film 512 and the light guide 513, and the QD lamps 514 are spaced apart from each other. The QD lamp 514 may be the QD lamp in any embodiment of FIG. 1 to FIG. 4.

Figure 6:
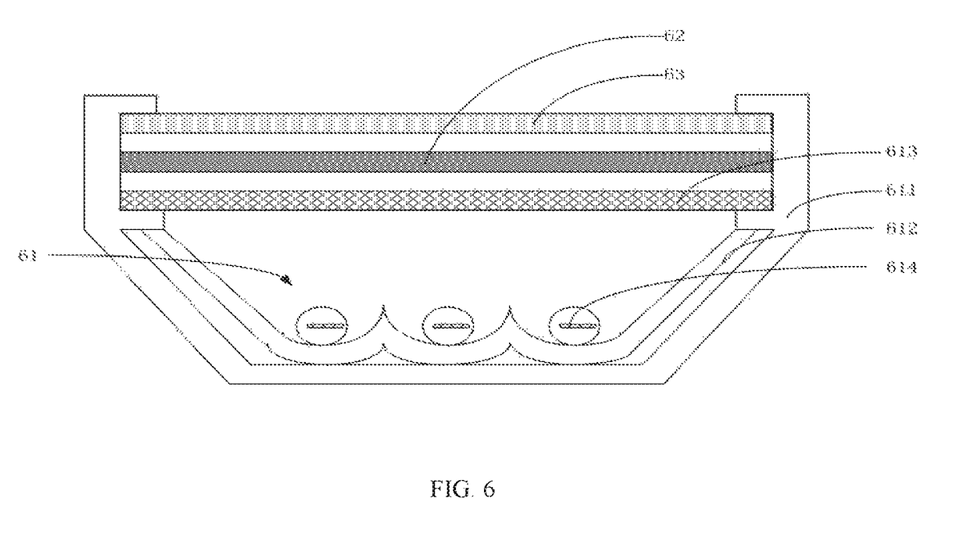
FIG. 6 is a schematic diagram of a display having direct-type backlight in accordance with another embodiment of the present disclosure.

In another embodiment of the present disclosure, as shown FIG. 6, a display having direct-type backlight is provided. The display includes a direct-type backlight module 61, an optical film set 62 disposed on the direct-type backlight module, and a display panel 63. The direct-type backlight module 61 includes an outer frame 611, a reflective film 612 disposed in the outer frame 611, a light guide 613 disposed on the reflective film 612, and a plurality of QD lamps 614.

The QD lamps 614 are configured between the reflective film 612 and the light guide 613, and the QD lamps are spaced apart from each other. The QD lamp 614 is the QD lamp in any embodiment of FIG. 1 to FIG. 4.

A plurality of reflective curves facing to the light guide 613 are formed on the reflective film 612, and the QD lamps are disposed in the reflective curves to insure that the reflective light is transmitted to the light guide.

Figure 7:
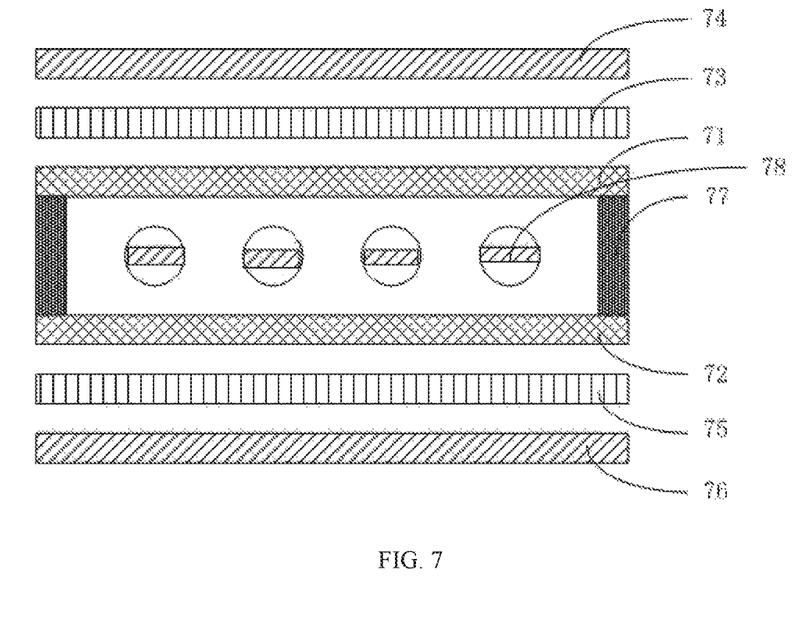
FIG. 7 is a schematic diagram of a display having direct-type backlight in accordance with another embodiment of the present disclosure.

In another embodiment of the present disclosure, as shown in FIG. 7, FIG. 7 is a schematic diagram of a two-sided display having direct-type backlight in accordance with one embodiment of the present disclosure. In the embodiment, the two sided display includes a first light guide 71 and a second light guide 72 disposed correspondingly with the first light guide 71, a first optical film set 73 and a first display panel 74 being sequentially disposed on one side of the first light guide 71, the one side of the first light guide 71 being away from the second light guide 72, and a second optical film set 75 and a second display panel 76 being sequentially disposed on one side of the second light guide 72, the one side of the second light guide 72 being away from the first light guide 71; wherein a closed space is formed in a frame sealing adhesive 77 between the first light guide 71 and the second light guide 72, and a plurality of quantum dot (QD) lamps 78 are disposed in the closed space, and are spaced with each other. The QD lamp 78 may be the QD lamp in any embodiment of FIG. 1 to FIG. 4.

In view of the above, the present disclosure uses the glass tube where the encapsulated LED light bar are disposed and the wall of the glass tube is coated with the QD phosphors, so as to provide the QDs the environment of water-oxygen barrier, and use less the QD material compared to the QD film, therefore lowering the cost. Furthermore, a plurality of LED chips radiates uniformly in the wall of the glass tube to activate the QDs to emit light, so as to solve the problem of difficult alignment between the QD tube and the LED light bar.

For the skilled in the art, it is clear that the disclosure is not limited to the details of an exemplary embodiment. And without departing from the spirit or essential characteristics of the present disclosure, it is possible to realize the disclosure with other specific forms. Therefore, no matter with any points, it should be seen as an exemplary embodiment, but not limiting, the scope of the present disclosure is defined by the appended claims rather than the foregoing description define, and therefore intended to fall claim All changes which come within the meaning and range of equivalents of the elements to include in the present invention.

What is claimed is:
1. A quantum dot (QD) lamp, comprising:
   an elongated glass tube having two closed ends, the elongated glass tube comprising an LED light bar, two ends of the LED light bar respectively configured with one electrode, and the electrode respectively protruding from the two ends of the glass tube;
   wherein an inner wall or an outer wall of the glass tube are coated with QD phosphors; and
   the LED light bar comprises a circuit substrate, a plurality of LED chips disposed on the circuit substrate, and a silica gel layer configured to encapsulate the LED chips on the circuit substrate, wherein radiating particles are dispersedly disposed in the silica gel layer, and inverted cones are formed in the silica gel layer corresponding to the top of each of the LED chips such that middle light of each of the LED chips forms broad angle light by reflection of the inverted cones, wherein the circuit substrate is a transparent flexible printed circuit and a reinforcing layer is further disposed on the silica gel layer, and the reinforcing layer is a glass substrate or a Sapphire substrate to reinforce the LED light bar.
2. The QD lamp as claimed in claim 1, wherein the inner wall of the glass tube is coated with the QD phosphors uniformly.
3. The QD lamp as claimed in claim 1, wherein the outer wall of the glass tube is coated with the QD phosphors uniformly, and the QD phosphors are covered by a water-oxygen barrier layer.
4. The QD lamp as claimed in claim 3, wherein the circuit substrate is a transparent flexible printed circuit or a Sapphire substrate.
5. The QD lamp as claimed in claim 3, wherein the water-oxygen barrier layer is made by SiOx material.
6. A display having direct-type backlight, comprising:
   a direct-type backlight module, an optical film set disposed on the direct-type backlight module, and a display panel, wherein the direct-type backlight module comprises a reflective film disposed in an outer frame, a light guide disposed on the reflective film, and a plurality of quantum dot (QD) lamps being configured between the reflective film and the light guide, the QD lamps being spaced apart from each other, each of the QD lamps comprising:

an elongated glass tube having two closed ends, the elongated glass tube comprising an LED light bar, two ends of the LED light bar respectively configured with one electrode, and the electrode respectively protruding from the two ends of the glass tube;

wherein an inner wall or an outer wall of the glass tube are coated with QD phosphors; and the LED light bar comprises a circuit substrate, a plurality of LED chips disposed on the circuit substrate, and a silica gel layer configured to encapsulate the LED chips on the circuit substrate, wherein radiating particles are dispersedly disposed in the silica gel layer, and inverted cones are formed in the silica gel layer corresponding to the top of each of the LED chips such that middle light of each of the LED chips forms broad angle light by reflection of the inverted cones, wherein the circuit substrate is a transparent flexible printed circuit and a reinforcing layer is further disposed on the silica gel layer, and the reinforcing layer is a glass substrate or a Sapphire substrate to reinforce the LED light bar.

7. The display as claimed in claim 6, wherein a plurality of reflective curves facing to the light guide are formed on the reflective film, and the QD lamps are disposed in the reflective curves.

8. A two-sided display having direct-type backlight, comprising:

a first light guide and a second light guide disposed correspondingly with the first light guide, a first optical film set and a first display panel being sequentially disposed on one side of the first light guide, the one side of the first light guide being away from the second light guide, and a second optical film set and a second display panel being sequentially disposed on one side of the second light guide, the one side of the second light guide being away from the first light guide; wherein a closed space is formed in a frame sealing adhesive between the first light guide and the second light guide, and a plurality of quantum dot (QD) lamps are disposed in the closed space and are spaced apart with each other, each of the QD lamps comprises:

an elongated glass tube having two closed ends, the elongated glass tube comprising an LED light bar, two ends of the LED light bar respectively configured with one electrode, and the electrode respectively protruding from the two ends of the glass tube;

wherein an inner wall or an outer wall of the glass tube are coated with QD phosphors; and the LED light bar comprises a circuit substrate, a plurality of LED chips disposed on the circuit substrate, and a silica gel layer being configured to encapsulate the LED chips on the circuit substrate, wherein radiating particles are dispersedly disposed in the silica gel layer, and inverted cones are formed in the silica gel layer corresponding to the top of each of the LED chips such that middle light of each of the LED chips forms broad angle light by reflection of the inverted cones, wherein the circuit substrate is a transparent flexible printed circuit and a reinforcing layer is further disposed on the silica gel layer, and the reinforcing layer is a glass substrate or a Sapphire substrate to reinforce the LED light bar.

\* \* \* \* \*